United States Patent
Taner

(10) Patent No.: US 9,283,963 B2
(45) Date of Patent: Mar. 15, 2016

(54) METHOD FOR OPERATING A DRIVER ASSIST SYSTEM OF AN AUTOMOBILE PROVIDING A RECOMMENDATION RELATING TO A PASSING MANEUVER, AND AN AUTOMOBILE

(75) Inventor: Anil Taner, Ingolstadt (DE)

(73) Assignees: AUDI AG, Ingolstadt (DE); AUDI ELECTRONICS VENTURE GMBH, Gaimersheim (DE)

( * ) Notice: Subject to any disclaimer, the term of this patent is extended or adjusted under 35 U.S.C. 154(b) by 1020 days.

(21) Appl. No.: 13/354,536

(22) Filed: Jan. 20, 2012

(65) Prior Publication Data

US 2012/0188374 A1    Jul. 26, 2012

(30) Foreign Application Priority Data

Jan. 21, 2011    (DE) .................. 10 2011 009 106

(51) Int. Cl.
| | |
|---|---|
| B60W 40/08 | (2012.01) |
| B60W 30/00 | (2006.01) |
| G08G 1/0962 | (2006.01) |
| B60W 50/14 | (2012.01) |
| B60W 30/18 | (2012.01) |

(52) U.S. Cl.
CPC ......... *B60W 30/18163* (2013.01); *B60W 30/00* (2013.01); *B60W 40/08* (2013.01); *B60W 50/14* (2013.01); *B60W 2050/146* (2013.01); *B60W 2420/403* (2013.01); *G08G 1/0962* (2013.01)

(58) Field of Classification Search
CPC ................ B60W 2050/146; B60W 2420/403; B60W 30/18163; B60W 40/08; B60W 30/00; B60W 50/14; G08G 1/0962
USPC .................. 348/148; 701/1–45, 301
See application file for complete search history.

(56) References Cited

U.S. PATENT DOCUMENTS

| | | |
|---|---|---|
| 8,041,483 B2 * | 10/2011 | Breed ............................ 701/46 |
| 2003/0025597 A1 * | 2/2003 | Schofield ...................... 340/435 |
| 2005/0125121 A1 * | 6/2005 | Isaji ...................... B60W 30/08 701/36 |
| 2005/0179527 A1 * | 8/2005 | Schofield ...................... 340/435 |
| 2006/0069478 A1 * | 3/2006 | Iwama ............................ 701/36 |
| 2008/0027607 A1 | 1/2008 | Ertl et al. |
| 2009/0212930 A1 * | 8/2009 | Pfeiffer et al. ................ 340/435 |
| 2009/0319112 A1 * | 12/2009 | Fregene ............... B60W 30/16 701/25 |
| 2010/0085427 A1 * | 4/2010 | Cheng et al. .................. 348/118 |
| 2012/0078500 A1 * | 3/2012 | Yamada et al. ............... 701/301 |
| 2012/0095641 A1 | 4/2012 | Merk |
| 2012/0143395 A1 * | 6/2012 | Yamada et al. .................. 701/1 |

(Continued)

FOREIGN PATENT DOCUMENTS

| | | |
|---|---|---|
| CN | 1942335 | 4/2007 |
| CN | 101542555 | 9/2009 |
| DE | 29508198 U1 | 7/1995 |

(Continued)

*Primary Examiner* — Gelek W Topgyal
(74) *Attorney, Agent, or Firm* — Henry M. Feiereisen LLC

(57) ABSTRACT

Method for operating a driver assist system of an automobile providing information regarding a passing maneuver, in particular a recommendation discouraging a passing maneuver, with a camera arranged on or in at least one outside mirror and oriented in the driving direction of the automobile, wherein the camera data are evaluated by the driver assist system and a length of an automobile in front and/or of an automobile convoy in front is determined in particular from the camera data and taken into consideration when determining the recommendation.

20 Claims, 3 Drawing Sheets

(56) References Cited

U.S. PATENT DOCUMENTS

2012/0154591 A1* 6/2012 Baur et al. .................... 348/148
2013/0250112 A1* 9/2013 Breed ........................... 348/148

FOREIGN PATENT DOCUMENTS

| | | |
|---|---|---|
| DE | 196 0 059 A1 | 7/1997 |
| DE | 197 25 656 A1 | 1/1998 |
| DE | 200 21 458 U1 | 8/2001 |
| DE | 100 61 781 A1 | 3/2003 |
| DE | 102 55 331 A1 | 6/2004 |
| DE | 102008012644 * 9/2008 | ............ B60W 30/16 |
| DE | 10 2008 012 644 A1 | 9/2009 |
| DE | 10 2009 008 656 A1 | 10/2009 |
| DE | 10 2009 040 674 A1 | 7/2010 |
| DE | 10 2009 009 191 A1 | 8/2010 |
| EP | 1 127 727 A2 | 8/2001 |
| WO | WO 2006/037360 A1 | 4/2006 |

* cited by examiner

METHOD FOR OPERATING A DRIVER ASSIST SYSTEM OF AN AUTOMOBILE PROVIDING A RECOMMENDATION RELATING TO A PASSING MANEUVER, AND AN AUTOMOBILE

CROSS-REFERENCES TO RELATED APPLICATIONS

This application claims the priority of German Patent Application, Serial No. 10 2011 009 106.8, filed Jan. 21, 2011, pursuant to 35 U.S.C. 119(a)-(d), the content of which is incorporated herein by reference in its entirety as if fully set forth herein.

BACKGROUND OF THE INVENTION

The present invention relates to a method for operating a driver assist system of an automobile providing information relating to a passing maneuver, in particular a recommendation discouraging a passing maneuver, with a camera provided on or in at least one outside mirror and oriented in the driving direction of the automobile, with the data from the camera being evaluated by the driver assist system. The invention also relates to an automobile with such driver assist system.

The following discussion of related art is provided to assist the reader in understanding the advantages of the invention, and is not to be construed as an admission that this related art is prior art to this invention.

When driving in an automobile, it is frequently different for the driver to correctly evaluate the actual risk of a passing maneuver. In particular when the automobile, for example on a rural road, is driving behind trucks, buses, minivans or minibuses, the passing maneuver is frequently made more difficult because the large automobile in front may make it impossible or difficult to see the opposite lane and hence also the oncoming traffic. Drivers must then frequently tilt their head to the side window before the passing maneuver or must drive far into the opposite lane so as to be able to detect oncoming traffic.

It was therefore proposed to assist the driver by integrating a camera in a side mirror of the automobile, in particular at the outermost tip of the side mirror, wherein the camera is oriented in the driving direction. For example, the image from the camera may be displayed on a display means located in the automobile, for example on a display screen, allowing a driver to evaluate the viability of a passing maneuver.

Another conventional system for obstacle detection for automobiles uses in addition a radar system which, however, requires an additional radar sensor which takes up space.

It would therefore be desirable and advantageous to obviate prior art shortcomings and to provide an improved method for operating a driver assist system with which a passing recommendation, in particular a passing warning, can be more safely and more easily provided.

SUMMARY OF THE INVENTION

According to one aspect of the present invention, a method for operating a driver assist system of an automobile includes the steps of evaluating with the driver assist system data from a camera arranged on or in at least one outside mirror and oriented in the driving direction, determining from the camera data a length of an automobile in front of the automobile or a length of an automobile convoy in front of the automobile, and providing a recommendation relating to a passing maneuver by taken into consideration the determined length when determining the recommendation.

The invention is therefore based on a system designed to assist the driver in the early phase of passing maneuvers by using a camera disposed on or in an outside mirror. Preferably, a "passing warning system" is used which issues a recommendation discouraging a passing maneuver, for example by a red light or another type of optical and/or acoustic and/or haptic warning. The recommendation, in particular the recommendation not to pass, may include additional information which will be described in detail below.

According to an advantageous feature of the present invention, it is herein proposed to determine as an important parameter also the length of an automobile in front and/or of an automobile convoy—meaning the length of the at least one automobile to be passed—and to consider this parameter in addition to the parameters that are already known from the state-of-the-art (distance, relative speed, time gap, operating data of the automobile), when evaluating the viability of the passing maneuver. The recommendation then becomes more reliable and the overall safety is enhanced, because the length plays an important role in the evaluation—in particular when passing convoys.

According to an advantageous feature of the present invention, the length may be determined from the data of the camera arranged in the outside mirror, obviating the need for additional sensors and the like. A length may be determined with a camera by determining from an actual camera image, for example with a suitable algorithm, the edge points of the front end and the rear end of the automobiles in front. Because the optics of the camera is fixed and also known to the driver assist system, the distances of the corner points and therefore also their spacings can be determined. The spacing between the automobiles of the convoy can then inherently also be taken into consideration and included in the overall length.

It should be noted that the length of at least the first automobile in front may alternatively be determined by an estimation. A vehicle type of the automobile immediately in front may also be determined from the actual camera image, in particular from the rear view, since a length is associated with each vehicle type. For example, it is possible to determine if the automobile in front is a passenger car, a truck or a cargo van, wherein the length of 5 m is assigned to a passenger car, the length of 20 m to a truck and the length of 10 m to a cargo van.

According to an advantageous feature of the present invention, in a convoy in front which is to be passed, at least one gap in the convoy may be determined and when a gap is sufficient for merging, only the automobiles to be passed up to the gap may be taken into consideration when determining the recommendation. After, as described above, the spacings between the individual vehicles in the convoy are anyway determined as part of the evaluation of a convoy to be passed, these spacings can advantageously be evaluated to determine if sufficient merging space exists, so that only a rear portion of the convoy must actually be passed in a single passing maneuver. In other words, the length of the at least one gap determines, which one or more automobiles in front must be passed in a single passing maneuver. For example, a gap sufficient for merging may be determined based on a threshold value. The length of detected gaps is thus compared with a threshold value which may be, for example, 15 m or 20 m; however, the threshold value is preferably selected to be speed-dependent, for example based on a functional dependence or a lookup table. In an advantageous embodiment, gaps suitable for merging may be displayed in an actual camera image displayed to the driver, in particular highlighted. The driver can then better judge the situation himself.

According to an advantageous feature of the present invention, by evaluating the data exclusively from the camera, at least one information relevant for the passing maneuver may be determined relating to an oncoming road user and/or at least one road user in front, in particular a distance to this road user and/or a speed of the road user and/or a time gap to the road user, and taken into consideration when determining the recommendation to be provided to the driver. According to another advantageous feature of the present invention, the environmental information relevant for determining the recommendation may altogether be determined exclusively from the camera data. For example, while the length of automobiles in front and/or the gaps between these automobiles can already be determined with a suitable image processing device exclusively from the camera data, information relating to oncoming traffic as well as additional information relating to traffic ahead, for example the distance to a road user or his speed or the time gap to the road users may advantageously also be determined from the camera data with the image processing unit. As already mentioned above, the distances can be readily determined when the optics of the camera is known, so that speeds and/or time gaps or the times to collision can be determined from the camera data alone by evaluating consecutive images. This can be done, as mentioned above, with the image processing unit, which ideally determines all environmental parameters to be considered for determining the recommendation, i.e. the length of an oncoming automobile and/or an automobile in front or gaps in the convoy in addition to the information relating to an oncoming road user and/or at least one road user in front. By computing from the camera images, i.e., the camera data, the distance and/or the speed and/or the time gap of the other automobiles, an additional radar sensor which is difficult to integrate in an outside mirror for lack of installation space may be eliminated. This provides cost benefits in addition to advantages for installation and design.

According to an advantageous feature of the present invention, a camera with a telephoto lens may be used. An embodiment with a telephoto lens advantageously allows automobiles to be identified at larger distances, for example at a distance from 400-500 m, and their distance and speed to be computed at the same time. The camera data should also permit the automobiles to be passed and their length to be identified before the passing maneuver and/or when the passing maneuver begins. This can be taken into account in this embodiment of the invention through selection of the objective. The appropriate aperture angle of the camera hereby depends on the available resolution of the camera and is hence defined depending on the employed camera. With a VGA resolution of the camera, a telephoto lens with an aperture angle of 5-6° may be selected. It should be noted here that an evaluation of 20-40 camera images per second should be enabled. The camera optics used with the method of the invention and the resolution of the sensor necessarily depends on the objective used for the camera, and vice a versa.

According to another advantageous feature of the present invention, which may be realized with a method of the aforedescribed type independent from the determination of the length of the at least one automobile in front or the convoy, predictive road data from a navigation system describing a future course of the road in front of the automobile may be taken into account when determining the recommendation. The determination of such predictive road data in a navigation system is generally known and may be implemented, for example, by determining first with a position sensor, in particular a GPS sensor, an actual geodetic position of the automobile, which is then matched to map data for determining the road on which the automobile is located. Information showing the course of the road further ahead of the automobile can be obtained based on the map data of the navigation system. Of course, other ways for updating predictive road data may be considered. These predictive road data can then be evaluated in relation to a possible passing maneuver, in particular if a passing maneuver should be discouraged. For example, a warning may be provided to the driver as a recommendation when oncoming road users cannot be detected by the camera due to a windy course of the road, and/or when an intersection is located at a predetermined distance range which may depend on the actual speed of the automobile, in particular without evaluating camera data. Additional important factors contributing to safety are thus taken into account. For example, the driver assistance system may recognize based on the predictive road data if the camera is able to see oncoming vehicles or not. For example, the camera (or another sensor oriented in the driving direction) may be unable to see oncoming vehicles in a right-hand curve. The predictive road data may also indicate when the automobile approaches an intersection which would allow other vehicles to enter the lane used for the passing maneuver. If such situation is identified, then a recommendation not to pass is outputted, whereby additionally information about the underlying reasons may be added. According to another advantageous feature of the present invention, after a warning has been outputted, corresponding information may be provided to the driver when a future course of the road can be considered for a passing maneuver. In other words, the driver may be informed when a straight road segment without an intersection is reached, where the passing maneuver may be more safety performed. It should be noted here that the predictive road data are preferably evaluated before the camera data are evaluated, so that the camera data need not even be evaluated when it was determined based on the course of the road that a passing maneuver cannot be reliably assessed based on the camera data.

With the method of the invention, a parameter indicating a possible intent to pass may typically be determined, whereby a recommendation may be provided only when the parameter indicates a possible intent to pass. Such approach is generally known, whereby criteria already used with lane departure warnings (LDW) and the like may be taken into consideration. For example, data from the camera and/or data from a transverse guidance driver assist system and/or data from a longitudinal guidance driver assist system and/or data for operating a direction indicator may be considered for determining the parameter. Advantageously, additional driver assist systems and data determined anyway by these driver assist systems may be used. For example, the identification may be based on data from driver assist systems for lane identification/lane departure warning and/or a cruise control with automatic distance control (ACC), which may for example provide a closing speed towards the automobile directly in front. The actuation of a turn signal may also indicate an intent to pass. These are independent driver assist systems which support the driver assist system for determining a recommendation relating to a passing maneuver and which can therefore be used with the method of the invention; however, these driver assist systems may also exist independent of the driver assist system providing the passing recommendation.

Rapidly closing in on an automobile in front and/or driving at the left edge of the road and/or operating a direction indicator may be considered as a criterion for a possible intent to pass when determining the parameter. Rapidly closing in on a vehicle in front or driving close to the left lane boundary is frequently observed when drivers intend to pass. Such criteria can therefore be advantageously used. The data suitable for the assessment may ideally be determined, as described above, by other driver assist systems.

According to yet another advantageous feature of the present invention, a warning with a corresponding message may be outputted as recommendation to the driver when a no-passing sign is detected from data of the camera and/or from data of another vehicle system and/or a continuous line to the passing lane is detected from data of the camera and/or data of another vehicle system and/or a speed limit is detected from data of the camera and/or from data of another vehicle system, which speed limit must be exceeded when performing a passing maneuver. A tolerance value for exceeding the speed limit may be stored in the system. It should also be noted that an image processing unit which evaluates anyway data from the camera provided with the invention may be configured to also identify, for example, traffic signs, in particular a continuous line to the passing lane. In particular, a camera installed in the outside mirror may recognize traffic signs earlier, because the camera is able to look beyond automobiles in front and the optics is designed for recognizing distant objects. Additional vehicle systems may also be used, for example vehicle systems specifically designed for recognizing traffic signs and/or speed limits. Moreover, navigation systems are known which include map data having as additional information passing bans and/or speed limits which can be read out. A continuous line to a passing lane can also be recognized by a transverse guidance driver assist system. Consequently, there are a number of possibilities for obtaining additional information to be taken into consideration when determining the recommendation.

As already mentioned, information relating to the viability of executing a passing maneuver may be determined and outputted. Preferably, only the recommendation that a passing maneuver is not or cannot be performed is indicated as a warning.

In summary, oncoming road users as well as road users driving in front and their distances and/or relative speeds and/or time gaps can be determined. In addition to the speed of at least one vehicle or a vehicle of the convoy to be passed, its/their length is also determined. Sufficiently large gaps between individual automobiles in a convoy may be identified and optionally displayed to the driver in the displayed camera image. Based on the length of the vehicle or the convoy to be passed, the speed of the traffic ahead, the maximum permitted speed and the posted rules for passing (passing ban, continuous line), the system computes, taking also into consideration information about an oncoming road user, if a passing maneuver can be performed or not, and provides the result to the driver, whereby optionally only a recommendation not to pass is outputted when passing is impossible. Additional information can be provided, stating the reason why a passing maneuver is not recommended. These considerations can be made after first considering the predictive road data, which may already result in a recommendation not to pass.

According to another aspect of the invention, an automobile includes a driver assist system, and a camera associated with the driver assist system and arranged on or in at least one outside mirror and oriented in the driving direction of the automobile. The driver assist system is configured to evaluate data from a camera, determine from the camera data a length of an automobile in front of the automobile or a length of an automobile convoy in front of the automobile, and provide a recommendation relating to a passing maneuver by taken into consideration the determined length when determining the recommendation. A controller of the driver assist system may be used for this purpose, in particular in connection with additional vehicle systems, which collects the data to be considered, processes the data and evaluates the data for determining and outputting the recommendation. All discussions relating to the method of the invention can likewise be applied to the automobile according to the invention so that the aforementioned advantages can hereby also be attained.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
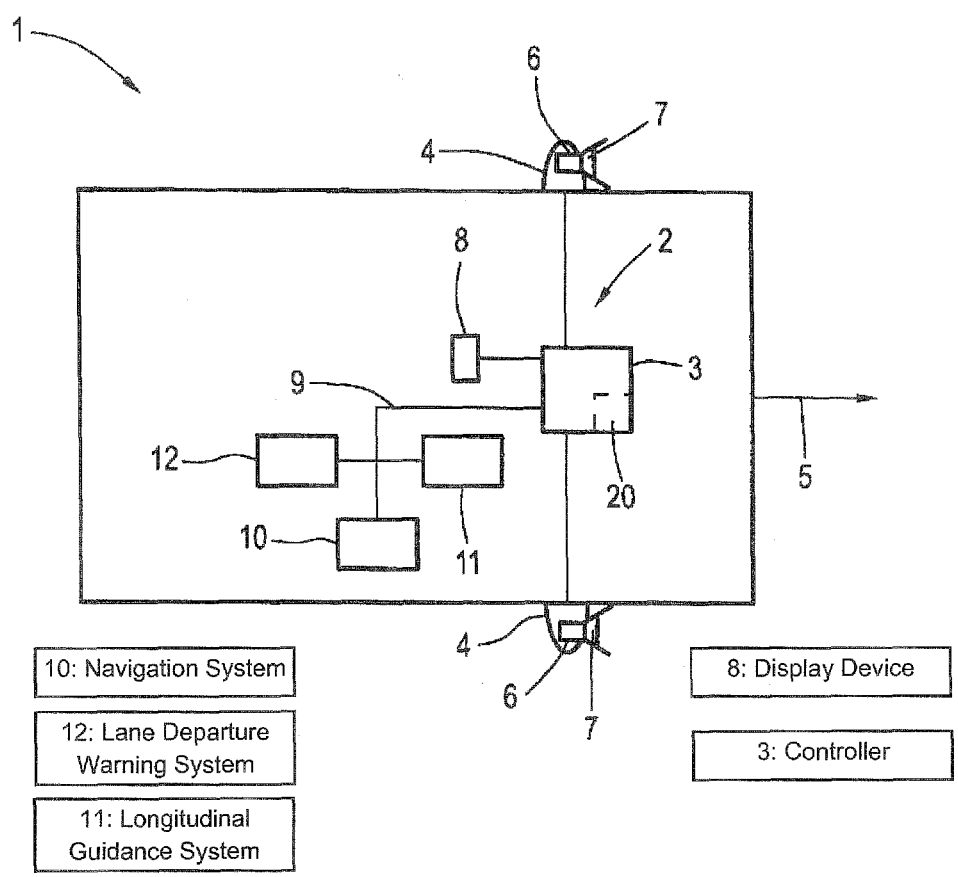
FIG. 1 shows an automobile according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of an automobile 1 according to the invention. The automobile includes a driver assist system 2 which outputs a recommendation relating to a passing maneuver, with a controller 3. The controller 3 also processes data from two cameras 6 which are arranged in the outside mirrors 4 of the automobile 1 and oriented in the driving direction 5 of the automobile 1. The cameras 6 are configured to record oncoming traffic and in a perspective view road users in front. The cameras 6 have a telephoto lens 7 which defines the aperture angle of the cameras 6, for example about 5-6 degrees for a VGA camera, because oncoming road users can then be recognized even at larger distances, for example 400 or 500 m, and information describing the road users can be obtained from the camera data, i.e. from the images.

If the automobile 1 is designed only for right-hand traffic, then a single camera 6 disposed in the left outside mirror 4 may be sufficient; this embodiment will be considered below.

The controller 3 may control a display device 8, in particular a display screen, where the actual images from the camera 6 can be displayed. The controller 3 is furthermore connected, for example by way of a CAN bus 9, with additional vehicle systems, for example a navigation system 10, a longitudinal guidance system 11, for example an ACC system, and a lane departure warning system 12. It will be understood that additional unillustrated vehicle system may be available, for example systems supplying the controller 3 with data about the own movement of the automobile 1, and the like.

Figure 2:
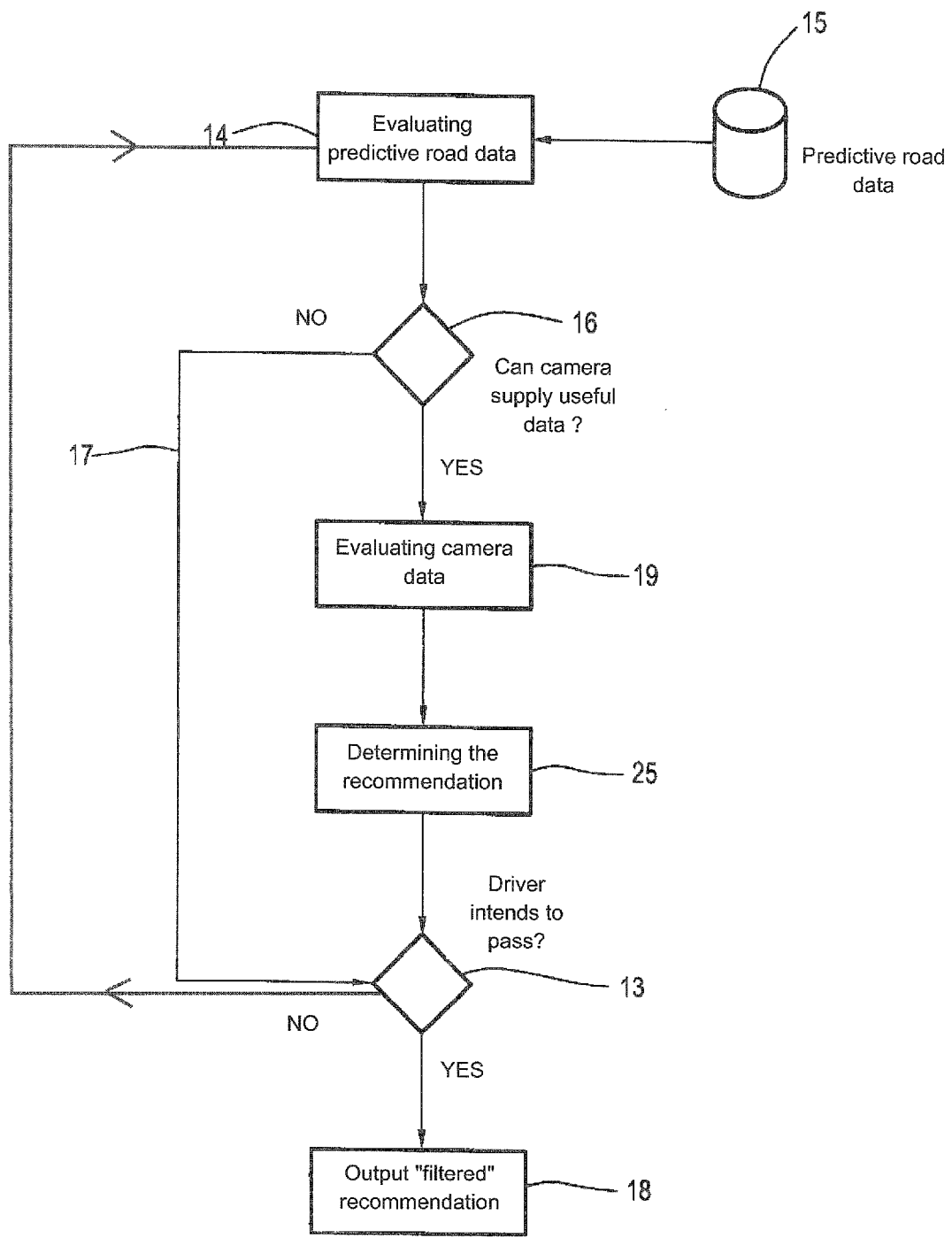
FIG. 2 shows a flow diagram of the method according to the invention.

The driver assist system 2 is configured for performing the method according to the invention, with in FIG. 2 showing in more detail an exemplary embodiment in form of a flow diagram. Initially, it is determined if a passing maneuver is possible, and if this is not the case, a corresponding warning is outputted as a recommendation before a passing maneuver is performed, which also includes information about the reason(s) why such passing maneuver is not advisable.

The predictive road data 15 provided by the navigation system 10 are initially evaluated at step 14. It is checked based on the predictive road data if the camera 6 is able to see oncoming road users at all or not, for example because an obscured curve or the like lies ahead. In addition, the predictive road data 15 also indicate the presence of intersections in the further relevant course of the road from which other road users may suddenly enter the passing lane. At step 16, a decision is made if according to the aforementioned criteria the camera 6 is able to supply useful data are not. If relevant road users cannot be reliably detected by the camera during a passing maneuver due to an intersection or a curve, then the process goes to step 13 following the arrow 17, where after checking that an intent to pass exists, a warning is outputted at step 18 as a recommendation not to proceed with a passing maneuver for the respective reasons. This warning may be indicated visually, for example on the display device 8, but also acoustically and/or haptically. The process then jumps again to step 14, where it is checked if the predictive road data 15 still indicate that the camera 6 does not provide data that can be evaluated in a meaningful way. Moreover, which is omitted from the flow diagram of FIG. 2 for sake of clarity, when an obstacle resulting from the predictive road data is no longer present, corresponding information that the object no longer exists may be provided to the driver.

However, if the predictive road data 15 indicate at step 16 that meaningful camera data can be obtained, then these camera data are evaluated at step 19 to obtain different information from the camera data. In particular, a large amount of the required information can be obtained exclusively from the camera data.

To be able to evaluate the data from the camera 6, the controller 3 may include, for example, an image processing unit 20, where the data relating to the optics of the camera 6 are also stored, which allow to compute the distances associated with the pixels and required for the subsequent computations.

Figure 3:
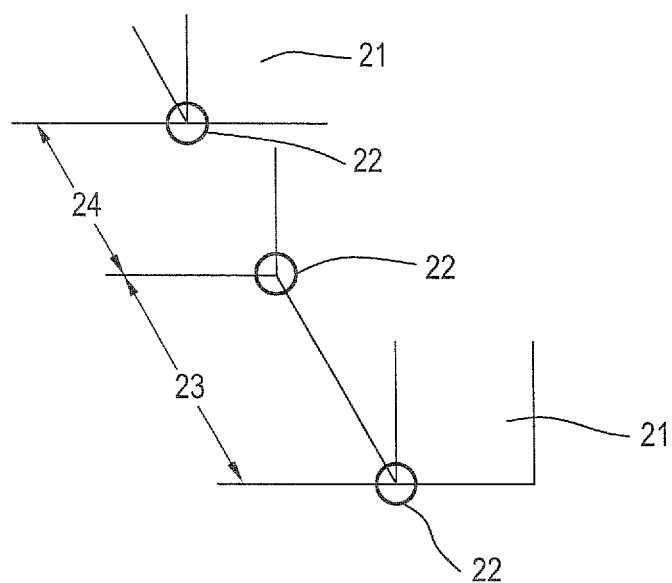
FIG. 3 shows a schematic diagram for determining a length from the camera image data.

Initially, road users driving in front of the automobile 1 are considered. It is hereby a major goal to determine the length of an automobile and/or of a vehicle convoy to be passed. This will be described in more detail with reference to FIG. 3, which shows only schematically the edges of two road users 21 in front. The front and rear corner points 22 are determined with a suitable algorithm. Because the optics of the camera is known, the distance between these corner points is also known, so that the length 23 of an automobile 21 in front as well as the length of the gap 24 between automobiles 21 in front can be determined.

The relative speed of road users 21 in front of the automobile 1 as well as their distance and the time gap can be determined by viewing several consecutive images. However, it should be noted that this information may be determined from other vehicle systems, for example the longitudinal guidance system 11.

The data concerning the gaps between the automobiles in front are of particular interest. If their length exceeds a predetermined threshold value, then it is recognized that a gap suitable for merging exists, making it unnecessary to consider road users 21 further ahead. The first gap suitable for merging thus determines the automobile or the automobile convoy to be passed. In this exemplary embodiment, gaps suitable for merging are furthermore marked and highlighted in the camera images displayed on the display device 8.

At step 19, information about the presence of an oncoming road user and, if such road user is present, the dynamics of this road user are obtained. The distance to the oncoming road users can then be determined—in the lane to be used during the passing maneuver—because the optics of the camera 6 is known, and information about the speed and/or the time gap can be obtained by viewing time-sequential images from the camera 6, which is possible from the data of the camera 6 alone. An additional radar sensor also arranged in an outside mirror 4 is then no longer required.

At step 19, it is also determined if traffic signs can be identified in the data of the camera 6 or from another camera, and if this is the case, if these data indicate a passing ban and/or a speed limit. It is also checked if the passing lane is separated from the actual driving lane by a continuous line, which also indicates a passing ban.

It should be noted at this point that data regarding a passing ban and/or a speed limit may also be obtained from other vehicle systems, for example from information contained in the map data of the navigation system 10 and/or from a vehicle system specifically designed to identify road signs. The information about a continuous lane marking may also be provided by the lane departure warning system 12. It will be understood that data from other vehicle systems may also be acquired and used.

All the collected data are then evaluated at a step 25 for determining the recommendation. For example, if a passing ban exists, a recommendation not to pass is outputted. This also applies if the permissible speed limit would be exceeded during a passing maneuver. In both cases, a corresponding message relating to these fact patterns is outputted in addition to the recommendation not to execute a passing maneuver. Information about the own automobile combined with information about automobiles in front, in particular their length or the length of the convoy, and information about oncoming traffic, in particular the distance and the speed, are then combined to determine if a save passing maneuver is possible while maintaining the speed limit. A passing ban alone represents a general exclusion criterion.

Finally, at the end of step 25, if a passing maneuver is to be discouraged, it is checked at step 13 if a possible intent of the driver of automobile 1 to pass can be detected. To this end, for example data from the driver assist systems 11 and 12 and/or data for actuating a direction indicator may be considered, which provide their data to the controller 3. It can be checked based on different criteria if an intent to pass by the driver can be recognized. For example, an intent to pass can be detected based on different criteria, for example by based on rapidly closing in on an automobile in front and/or if the driver of the automobile 1 drives along the left lane edge. If a conclusive intent to pass is detected, the data from the left camera 6, i.e. the images, are displayed on the display device 8. The intent to pass is thus determined at the end as a kind of "filter" wherein the corresponding recommendation is finally outputted to the driver only after an intent to pass is identified at step 18. Otherwise, the process begins again directly at step 14.

It should be noted here that in certain embodiments an intent to pass may be checked before the recommendation is determined, so that the recommendation may optionally be eliminated in the absence of an intent to pass.

A reliable warning of dangerous or prohibited passing maneuvers can thus be generated and outputted through maximum use of the camera data and a targeted evaluation, wherein information from additional vehicle systems may be additionally used.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for operating a driver assist system of an automobile driving in a lane, comprising the steps of:
    evaluating with the driver assist system of the automobile data from a camera arranged on or in at least one outside mirror and oriented in the driving direction of the automobile,
    determining from the camera data a length of another automobile in front of the automobile or a length of an automobile convoy in front of the automobile, said other automobile or automobile convoy driving in the same lane as the automobile, based on known design parameters of the camera and based on edge points of a front end and a rear end of the other automobile or automobile convoy in front, and
    providing a recommendation relating to a passing maneuver by taking into consideration the determined length before initiating the passing maneuver.

2. The method of claim 1, wherein the recommendation is a recommendation discouraging the passing maneuver.

3. The method of claim 1, further comprising
    determining at least one gap in the convoy in front which is to be passed, and
    when the at least one gap is sufficient for merging, taking into consideration for determining the recommendation only the automobiles to be passed up to the gap.

4. The method of claim 1, wherein information relevant for the passing maneuver and relating to an oncoming road user and/or at least one road user in front of the automobile is determined exclusively from the camera data and the so determined information is taken into consideration when determining the recommendation to be provided to a driver of the automobile.

5. The method of claim 4, wherein the relevant information relates to a distance to the oncoming road user and/or the at least one road user in front and/or to a speed of the oncoming road user and/or the at least one road user in front and/or to a time gap to the oncoming road user and/or the at least one road user in front.

6. The method of claim 1, wherein the camera comprises a telephoto lens.

7. The method of claim 1, further comprising taking into consideration predictive road data from a navigation system describing a future course of the road when determining the recommendation.

8. The method of claim 7, further comprising outputting a warning to a driver of the automobile as the recommendation when the camera is unable to detect oncoming road users due to a windy course of the road.

9. The method of claim 7, further comprising outputting a warning to a driver of the automobile as the recommendation when an intersection is located in a predetermined distance range.

10. The method of claim 9, wherein the warning is outputted depending on an actual speed of the automobile.

11. The method of claim 9, wherein the warning is outputted without evaluating camera data.

12. The method of claim 9, wherein after a warning has been outputted, information is provided to the driver when a future course of the road can be considered to be viable for a passing maneuver.

13. The method of claim 1, wherein information indicating viability of a passing maneuver is determined and outputted as the recommendation.

14. The method of claim 1, further comprising
    determining a parameter indicating a potential intent to pass, and
    provided the recommendation only when the parameter indicates an actual intent to pass.

15. The method of claim 14, further comprising taking into consideration for determining the parameter data from the camera, or data from a transverse guidance driver assist system, or data from a longitudinal guidance driver assist system, or data for operating a direction indicator, or a combination thereof.

16. The method of claim 14, wherein the parameter is determined based on the automobile rapidly closing in on an automobile in front, or driving at the edge of the road, or operating a direction indicator, or a combination thereof.

17. The method of claim 1, wherein a warning with a corresponding message is outputted as the recommendation to a driver of the automobile when a no-passing sign is detected from data of the camera or from data of another vehicle system.

18. The method of claim 1, wherein a warning with a corresponding message is outputted as the recommendation to a driver of the automobile when a continuous line to the passing lane is detected from data of the camera or from data of another vehicle system.

19. The method of claim 1, wherein a warning with a corresponding message is outputted as the recommendation to a driver of the automobile when a speed limit is detected from data of the camera or from data of another vehicle system, which speed limit must be exceeded when performing the passing maneuver.

20. An automobile driving in a lane, comprising
    a driver assist system,
    a camera associated with the driver assist system and arranged on or in at least one outside mirror and oriented in the driving direction of the automobile,
    wherein the driver assist system is configured to
    evaluate data from the camera,
    determine from the camera data a length of another automobile in front of the automobile or a length of an automobile convoy in front of the automobile, said other automobile or automobile convoy driving in the same lane as the automobile, based on known design parameters of the camera and based on edge points of a front end and a rear end of the other automobile or automobile convoy in front, and
    provide a recommendation relating to a passing maneuver by taking into consideration the determined length before initiating the passing maneuver.

* * * * *